United States Patent [19]

Desourdy

[11] 4,119,210
[45] Oct. 10, 1978

[54] PIPE LAYING AND TRANSPORTING VEHICLE

[76] Inventor: Bernard Desourdy, 545 deNormandie St., Longueuil, Canada

[21] Appl. No.: 789,061

[22] Filed: Apr. 20, 1977

[51] Int. Cl.$^2$ .............................................. B66C 23/42
[52] U.S. Cl. .................................. 214/1 PA; 180/8 R
[58] Field of Search .................... 214/1 PA, 394, 500, 214/512; 180/8 R, 8 B

[56] References Cited

U.S. PATENT DOCUMENTS

| 3,258,135 | 6/1966 | Bigge | 214/1 PA |
| 4,068,764 | 1/1978 | Loeber | 214/1 PA |

*Primary Examiner*—Albert J. Makay
*Assistant Examiner*—George F. Abraham

[57] ABSTRACT

A vehicle for easy and convenient transporting and laying of a large diameter pipe or pipe section, in particular in a tunnel. This pipe laying and transporting vehicle comprises an elongated frame defining opposite end portions and a central portion, roadwheels arranged in a single longitudinal row, and each selectively steered and raisable relative to the frame, and connected to one of the end portions, a pair of carrying devices mounted on the central portion and engaging a pipe section to carry it as it is surrounding the central portion, and each carrying device being upwardly and laterally displaceable and including rollers engaging the inner face of the pipe section and driven to selectively rotate the latter about its longitudinal axis and transversely align the same with a precedingly installed pipe section.

4 Claims, 9 Drawing Figures

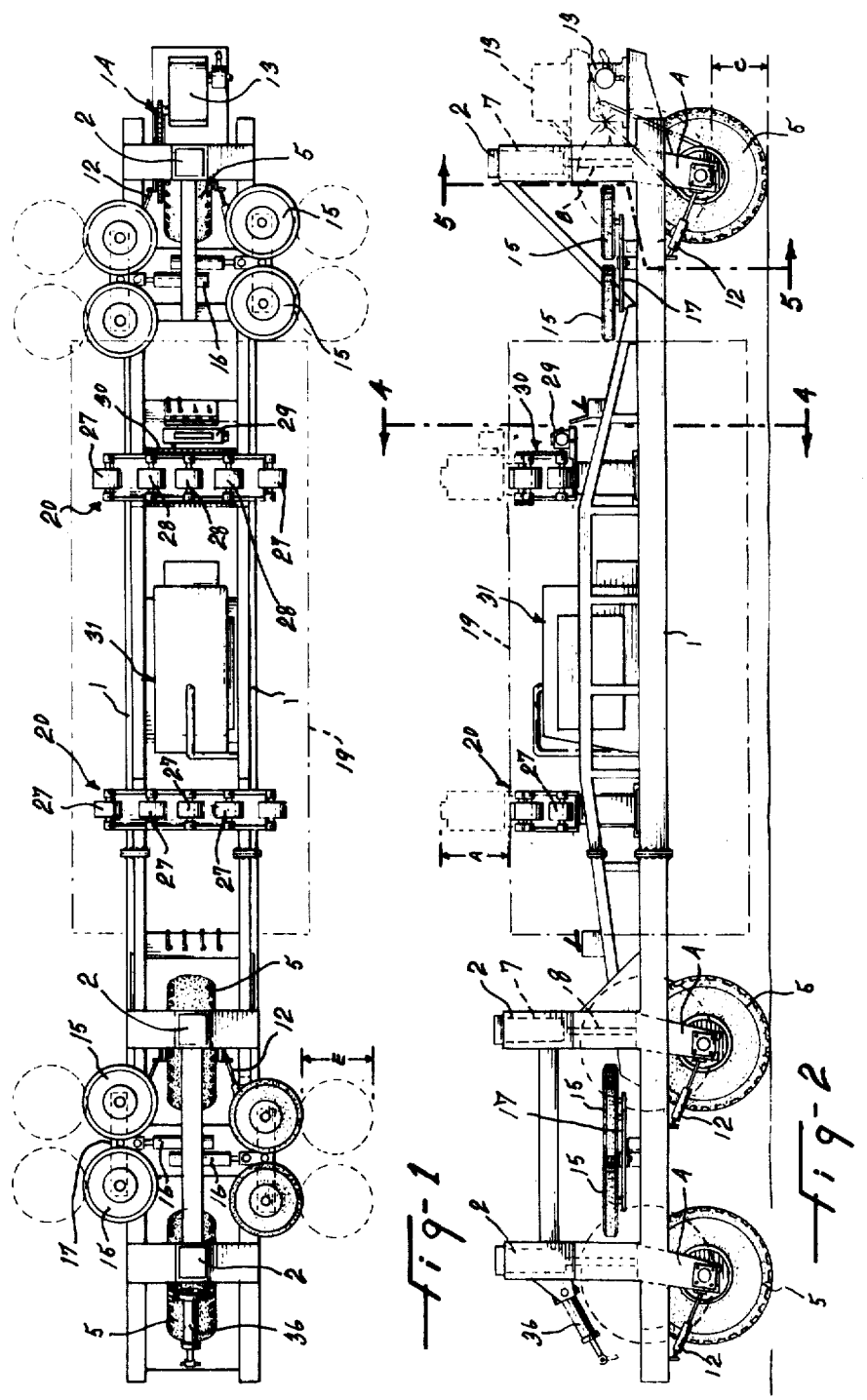

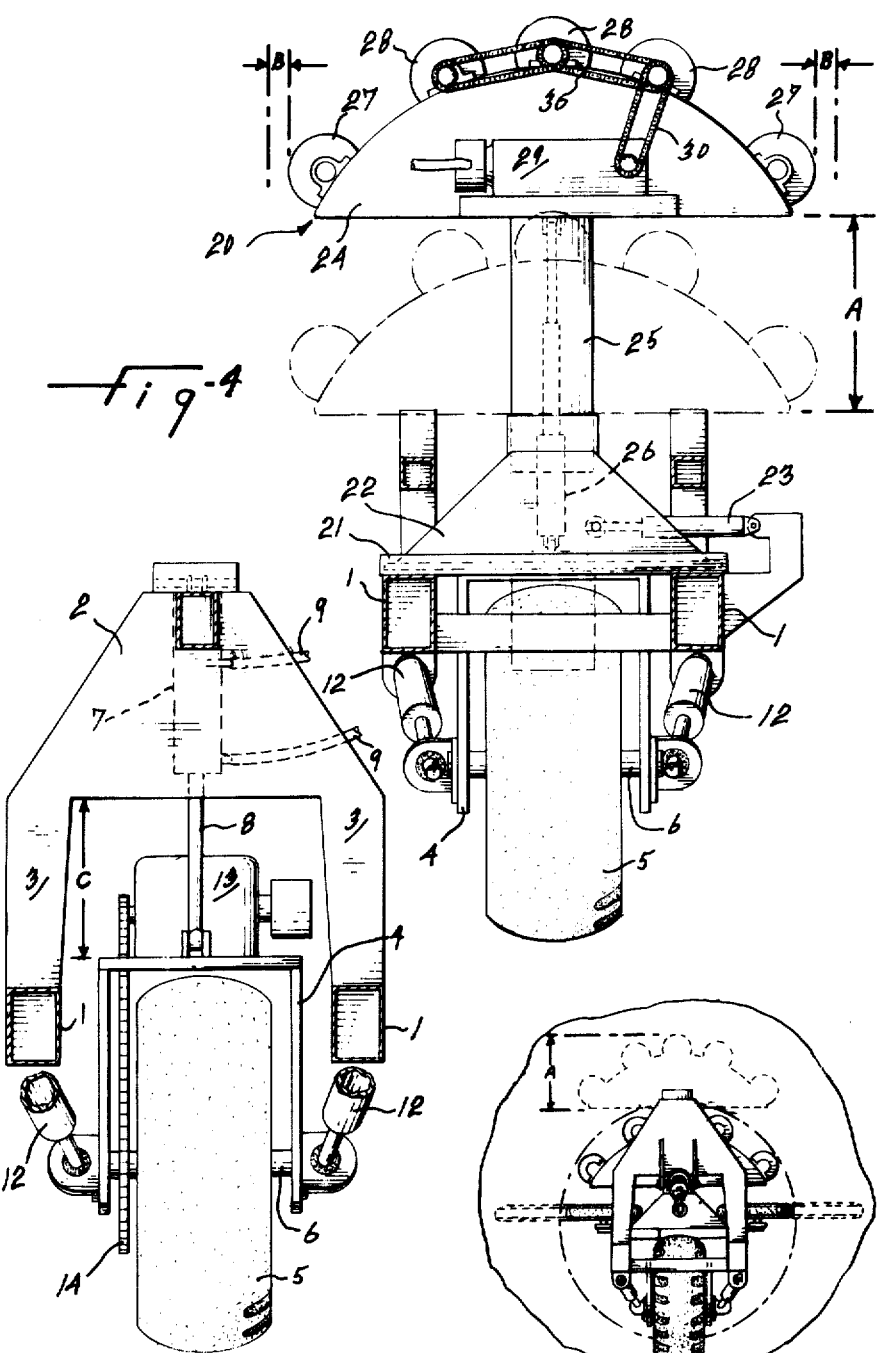

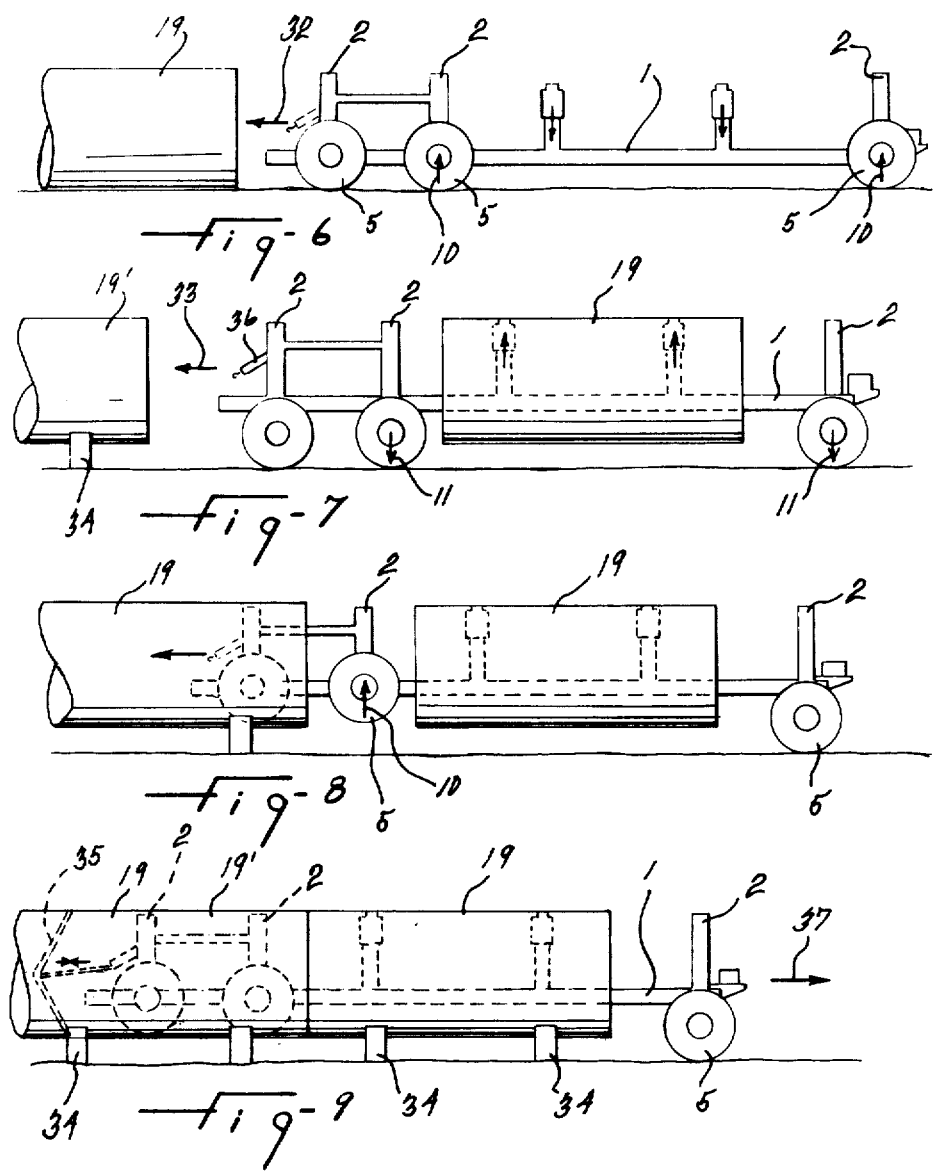

PIPE LAYING AND TRANSPORTING VEHICLE

This invention relates to a vehicle and, more particularly, to a vehicle of the type adapted for transporting and laying a pipe or pipe sections of relatively large diameter, such as for instance of 8 or more feet in diameter.

The pipe sections of 8 or more feet in diameter which are commonly used to lay a water supply pipeline are very heavy and must be transported and layed with a crane or the like machine. The laying of such pipe or pipe sections in a tunnel is even more difficult due to the limited tunnel space available to use appropriate equipment.

It is a general object of the present invention to provide a vehicle or machine which accelerates and facilitates the laying of a pipe or pipe section, in particular in a tunnel.

It is a more specific object of the present invention to provide a vehicle which conveniently transports the above-mentioned pipe sections and position the latter for laying of a pipeline.

It is another object of the present invention to provide a pipe laying and transporting vehicle which is self-sufficient to pick up, transport and position a pipe or pipe section.

It is a particular object of the present invention to provide a pipe laying and transporting vehicle which is specifically adapted for use in a tunnel and takes advantage of the lateral side walls of the tunnel for its lateral equilibrium and for a simpler system of roadwheels and steering thereof.

It is a more specific object of the present invention to provide a pipe laying and transporting vehicle which includes a simple roadwheel and steering system including roadwheels arranged in a single longitudinal row and a simple independent pivoting of each roadwheel with laterally projecting guide wheels to engage the lateral side walls of the tunnel and thus keep the transverse equilibrium of the vehicle.

The above and other objects and advantages of the present invention will be better understood with reference to the following detailed description of a preferred embodiment thereof which is illustrated, by way of example, in the accompanying drawings, wherein:

FIG. 1 is a top view of a pipe laying and transporting vehicle according to a preferred embodiment of the present invention;

FIG. 2 is a side elevation view of the vehicle of FIG. 1;

FIG. 3 is a front elevation view of the same pipe laying and transporting vehicle;

FIGS. 4 and 5 are cross-sectional views as seen along lines 4—4 and 5—5 respectively in FIG. 2; and FIGS. 6, 7, 8, and 9 are schematic side elevation views of the same vehicle showing as many distinct sequential positions of operation thereof.

The pipe laying and transporting vehicle, as illustrated in the accompanying drawings, comprises an elongated frame including a pair of laterally spaced-apart and rigidly interconnected beams 1. This elongated frame defines a front portion, a rear portion and a central portion. A pair of forked frame structures 2 are rigidly connected to the beams 1 at the front portion and a single forked frame structure 2 is rigidly connected to the beams 1 at the rear portion. Each forked frame structure 2 has opposite legs 3 fixedly secured at their lower end onto the beams 1 respectively, as best shown in FIG. 5. Each forked frame structure 2 is provided with a wheel and axle assembly, a steering system and an elevating device, as hereinafter defined in detail.

Each wheel and axle assembly includes a U-shaped bracket 4, a roadwheel 5 and an axle 6 rotatably supporting the roadwheel relative to the U-shaped bracket. The elevating device includes a hydraulic cylinder 7 longitudinally extending upright and fixed inside the corresponding forked frame structure 2. Each hydraulic cylinder 7 includes a piston rod 8 having its lower end rigidly fixed to the U-shaped bracket 4 of the corresponding wheel and axle assembly and rotatable about its longitudinal axis which thus constitutes the steering axis for the corresponding wheel and axle assembly. The actuation of the hydraulic cylinder 7 by the corresponding hydraulic fluid lines 9 relatively produces retraction or extension of the piston rod 8 and a corresponding elevation or lowering of the associated roadwheel 5. Thus, as indicated by the vertical arrows 10 and 11 in FIGS. 6-9, each roadwheel may be selectively elevated or lowered relative to the elongated frame defined by the longitudinal beams 1. It must be noted that each wheel and axle assembly includes a single roadwheel 5 which is transversely centered relative to the vehicle and such that the three roadwheels are longitudinally aligned in a single row.

Of course, each single wheel could be replaced by a dual wheel and the rear wheel and axle assembly could include a pair of roadwheels axially spaced apart transversely of the vehicle to provide transverse equilibrium to the latter.

The steering assembly for each wheel and axle assembly includes a pair of hydraulic cylinders 12 connected on opposite sides respectively of the corresponding U-shaped bracket 4, at one end to the latter and at the other end to the corresponding beam 1. The concerted actuation of the hydraulic cylinders 12 produces steering of the corresponding roadwheel. Thus, each wheel and axle assembly is individually steered for transverse control of the vehicle.

The rear portion of the vehicle constitutes the propulsive portion and, to that effect, is provided with an engine 13 connected by a chain drive 14 to the axle 6 of the corresponding roadwheel 5. It must be noted that this rear portion need not be motorized, in which case the vehicle would be powered by a tractor or the like. Besides, the propulsive portion of the vehicle could constitute a tractor type unit pivotally coupled to the remainder trailer-like portion of the vehicle. Such tractor type unit can then take any known and appropriate form.

The vehicle is laterally guided and kept in equilibrium relative to the central row of roadwheels 5 by laterally projecting guide wheels 15 arranged in two sets connected to the opposite end portions of the vehicle. Each set of guide wheels 15 includes two guide wheels on each side of the vehicle and connected to an adjustable device to be laterally adjusted relative to the vehicle. The adjustable device includes a hydraulic cylinder 16 longitudinally extending transversely relative to the vehicle, and a walking beam 17 centrally pivoted about an upright axis on the outer end of the piston rod of the corresponding cylinder. The pair of guide wheels 15 at each end and on each side of the vehicle are rotatably connected to the opposite ends respectively of the corresponding walking beam 17 to rotate substantially in a horizontal plane and longitudinally roll relative to the elongated frame against the inner face of a tunnel shown by the outline 18 or of a pipe section, shown by the outline 10; both in FIG. 3. The hydraulic cylinders 16 serve to adjust the guide wheels 15 transversely outward, as indicated by the arrow and letter E in FIG. 3, as required to pass from the inner face of the tunnel 18 to the inner face of a pipe section 19, and vice versa.

A pair of carrying devices 20 are mounted on the central portion of the elongated frame and adapted to carry a pipe section 19 as it is surrounding the central portion, as shown in FIGS. 1, 2, 3, 7, 8, and 9 of the drawings. A pair of transverse frame structures 21 are fixed to the beams 1 and form each a base for a corresponding carrying device 20. A base member 22 is mounted on each frame structure 21 and transversely slides on the latter relative to the frame of the vehicle. A hydraulic cylinder 23 longitudinally extends transversely of the vehicle and is connected at its opposite ends to the base member 22 and to the frame to adjustably displace the base member and thus the whole corresponding carrying device laterally relative to the vehicle frame. Each carrying device 20 includes a support 24 having a stem portion 25 rigidly projecting downward from the bottom thereof and slidable longitudinally upright in an aperture of the corresponding base member 22. A hydraulic cylinder 26 longitudinally extends upright and is connected at its opposite ends to the support 24 to adjustably displace the support 24 up or down. A series of idler rollers 27 and driven rollers 28 are rotatably mounted on the support members 24 and axially extend parallel to each other and to the beams 1. Each roller 27 and 28 radially projects outward relative to the corresponding support 24 to roll in contact with the inner face of the carried pipe section 19. A motor 29 is mounted on the rear support 24 and connected by a chain drive 30 to the shaft of the rollers 28 to selectively rotate the latter in either of the two angular directions thereof. The motor 29 constitutes a hydraulic motor driven by the hydraulic fluid supplied by a hydraulic fluid supply and pump unit 31. Appropriate valve control units 32 and 33 are provided to selectively actuate the respective hydraulic actuators including the cylinders 12, 16, 23, and 26.

The pipe laying and transporting vehicle according to the illustrated embodiment is specifically adapted to be used in a tunnel, since it essentially has only a single row of roadwheels 5 and it needs to find lateral equilibrium with the guide wheels 15. A vehicle according to another embodiment of the present invention could be made to transport the pipe sections 19 in an open area by providing the rear portion of the vehicle with inherent equilibrium, such as by laterally spaced-apart roadwheels.

To lay a pipe in a tunnel, the roadwheels 5 are upwardly elevated or retracted and the carrying devices 21 are lowered relative to the elongated frame to allow the vehicle to engage forwardly in a pipe section 19, as shown by the arrow 32 in FIG. 6. The carrying devices 20 and the roadwheels 5 are then outwardly extended to lift the pipe section 19 off the ground while it is surrounding the central portion of the elongated body. The vehicle then proceeds toward the installed portion of the pipe line, as indicated by the arrow 33 in FIG. 7, and the pipe section 19′ installed on cross members 34.

When the front of the vehicle reaches the installed pipe section 19′, the foremost roadwheel 5 is elevated to allow the front of the vehicle to engage in the installed pipe section 19′. Then the foremost roadwheel 5 is lowered to carry the weight of the front portion of the vehicle in replacement of the other forward roadwheel 5 which is in turn elevated to penetrate in the pipe section 19′, as shown in FIG. 8. An anchor device 35 is then deployed inside the installed pipe section 19′ and connected to a hydraulic cylinder 36 at the front of the vehicle. The hydraulic actuators which produce the desired transverse control are then actuated to align the carried pipe section 19 with the installed pipe section 19′. Then, the hydraulic actuator 36 is contracted to draw the carried pipe section 19 in tight and sealed engagement with the outer end of the installed pipe section.

After further crossmembers 34 have been put in place to carry the still carried pipe section 19, the vehicle is actuated to roll out of the installed portion of the pipeline, as shown by the arrow 37 in FIG. 9.

It must be understood that many changes in the nonessential details of construction may be made without departing from the spirit and scope of the present invention and features claimed.

What I claim is:

1. A pipe laying and transporting vehicle comprising an elongated frame defining a pair of opposite end portions and a central portion intermediate said end portions, first and second roadwheels mounted underneath one end portion for carrying the same and a third roadwheel mounted underneath the other end portion for carrying the same, said roadwheels disposed in a single row centrally and longitudinally of the elongated frame, an elevating device for each roadwheel connected between the same and the respective end portions for selectively elevating and lowering the roadwheels relative to said end portions, a steering system for each of said first, second, and third roadwheels, motor means mounted on the elongated frame and connected to said third roadwheel for producing propulsion of the pipe laying and transporting vehicle, guide wheels connected to each end portion and laterally projecting from each side thereof, said guide wheels outwardly adjustable relative to said frame towards operative engagement with a sidewall to laterally stabilize said vehicle, a pair of carrying devices mounted on said central portion and spaced apart therealong and operatively engaging a pipe section to carry it as it is surrounding said central portion with said opposite end portions of said frame and with said roadwheels being on the outside of the ends of said pipe section, each carrying device including an upright support, rollers carried by the upper end of said support and axially extending longitudinally of said elongated frame, parallel one to another and radially projecting outward from the corresponding support into operative rolling engagement against the inner face of an overlying portion of a pipe section, a drive connected to the rollers to selectively rotate the latter in either of the two angular directions to rotate the pipe about its longitudinal axis, means mounting said support for up-and-down movement and for transverse movement relating to said elongated frame, first power means to raise and lower said support and rollers relative to said elongated frame, and second power means to transversely shift said support and rollers relative to said elongated frame.

2. A pipe laying and transporting vehicle as defined in claim 1, wherein there is a pair of guidewheels on each side of each end portion of the frame, each pair of guidewheels being rotatably carried at the opposite ends, respectively, of a walking beam about an upright axis, each walking beam being pivoted intermediate its ends about an upright pivot axis on the outer end of a hydraulic cylinder and piston unit supported in horizontal position by said elongated frame and extending laterally outwardly therefrom to selectively displace the pair of guidewheels outwardly and inwardly transversely of the elongated frame.

3. A pipe laying and transporting vehicle as defined in claim 1, wherein each elevating device includes a bracket supporting the corresponding roadwheel and an elevating hydraulic cylinder connected to said bracket and to the corresponding end portion of said elongated frame, the elevating hydraulic cylinder extending upright and defining the steering axis for the corresponding roadwheel.

4. A pipe laying and transporting vehicle as defined in claim 3, wherein each of said steering systems includes a pair of hydraulic cylinders connected to the bracket on opposite sides thereof, and connected to the elongated frame for selectively steering the corresponding roadwheel about the steering axis defined by the corresponding elevating hydraulic cylinder.

* * * * *